I. O. DENMAN.
VEHICLE FENDER.
APPLICATION FILED FEB. 5, 1915.
1,166,581.
Patented Jan. 4, 1916.
2 SHEETS—SHEET 1.
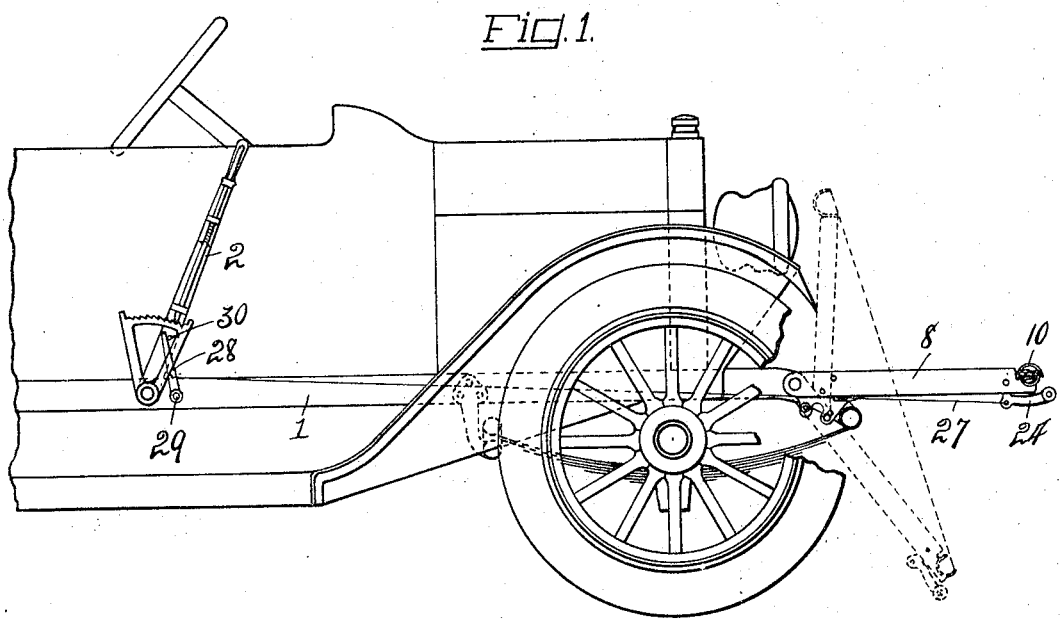
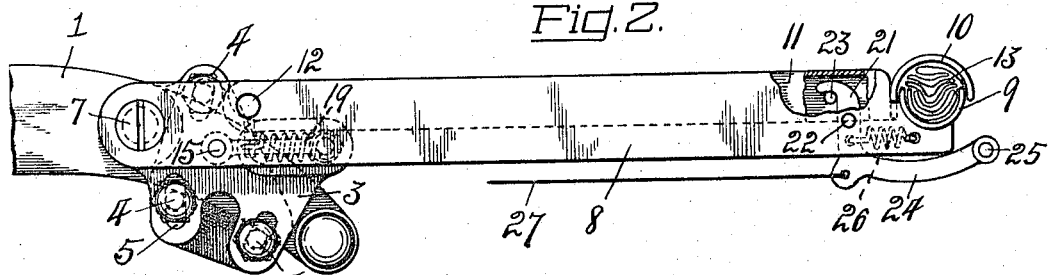
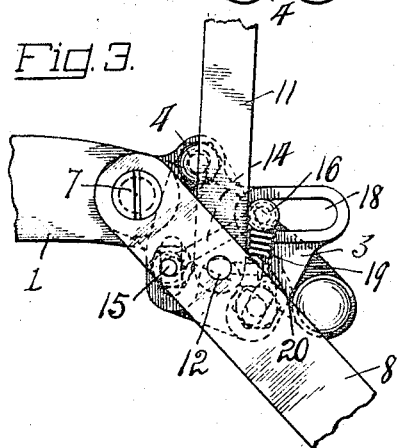
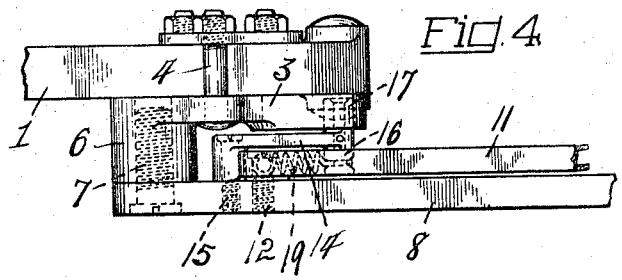
WITNESSES:
INVENTOR.
Ira O. Denman,
By Owen, Owen & Crampton
His attys.

I. O. DENMAN.
VEHICLE FENDER.
APPLICATION FILED FEB. 5, 1915.
1,166,581.
Patented Jan. 4, 1916.
2 SHEETS—SHEET 2.
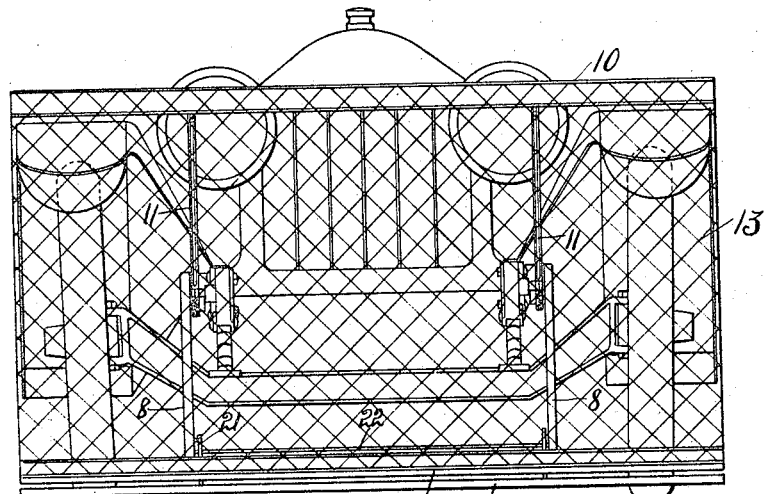
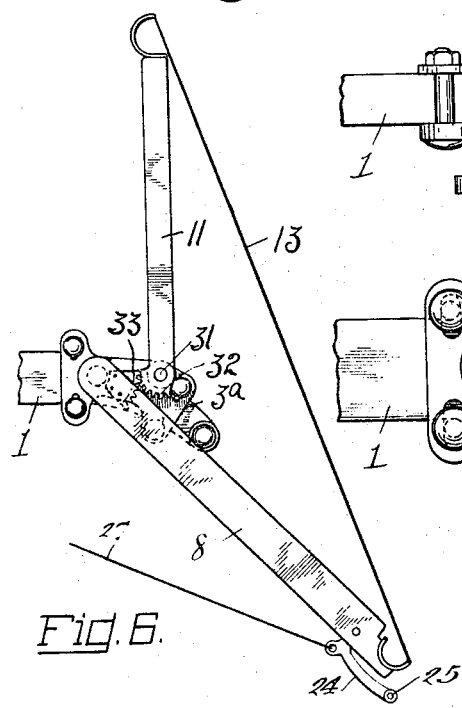
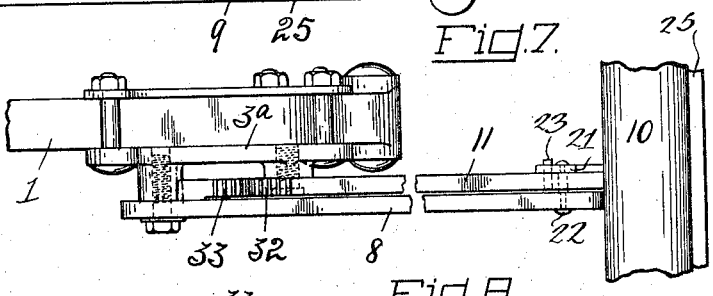
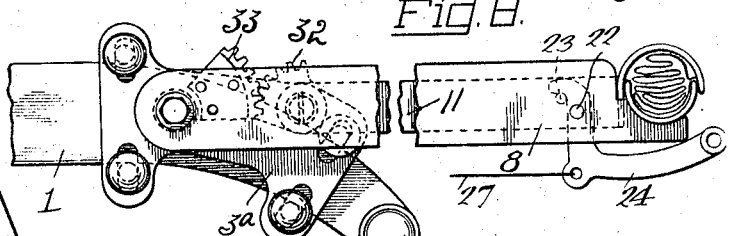
WITNESSES:
INVENTOR.
Ira O. Denman,
By Owen, Owen & Crampton,
His attys.

UNITED STATES PATENT OFFICE.

IRA O. DENMAN, OF TOLEDO, OHIO.

VEHICLE-FENDER.

1,166,581.  Specification of Letters Patent. Patented Jan. 4, 1916.

Application filed February 5, 1915. Serial No. 6,242.

*To all whom it may concern:*

Be it known that I, IRA O. DENMAN, a citizen of the United States, and a resident of Toledo, in the county of Lucas and State of Ohio, have invented a certain new and useful Vehicle-Fender; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to folding fenders or collapsible fenders for automobiles.

The primary object of my invention is the provision of an improved device of this character which is light, simple and inexpensive in its construction, efficient in its operation and capable of being compactly folded in the form of a bumper when not in use.

A further object of my invention is the provision of means which is automatically operable upon the striking of an object thereagainst, and is also manually operable by the driver from the seat in the car, to release the fender to permit it to quickly open or unfold to operative position.

The invention is fully described in the following specification, and while, in its broader aspect, it is capable of embodiment in numerous forms, a preferred embodiment thereof is illustrated in the accompanying drawings, in which,—

Figure 1 is a side elevation of the front portion of an automobile equipped with my invention, which latter is shown folded in full lines and in open position in dotted lines. Fig. 2 is an enlarged side elevation of the fender embodying the invention in closed position. Fig. 3 is a similar view thereof with the fender in open position and with parts broken away. Fig. 4 is a top plan view of the fender as it appears in Fig. 2 with parts broken away. Fig. 5 is a front elevation of the fender attached to a car and in full open position. Fig. 6 is a side elevation of a modified form of the fender in full open position, and Figs. 7 and 8 are enlarged plan and side elevations thereof in closed positions with portions broken away.

Referring to the drawings, 1, 1 designate the customary side bars of an automobile chassis, and 2 the customary emergency brake lever of the machine. Secured to the front end portion of each side bar 1 is a bracket member 3, which is rigidly attached to the side bar by bolts 4, which bolts pass through slots 5 in the bracket member to permit the bolts to have transverse adjustment relative thereto to suit the size of the frame bar 1 to which it is attached. Each bracket member 3 is provided at its rear end portion with a boss 6, which projects outward therefrom transverse to the frame bar 1 and is adapted to receive a pivot screw 7 in the outer end thereof for carrying an adjacent fender arm 8. The fender arms 8, 8 project forward from the respective bracket members 3 and are connected at their outer or free ends by a channel bar 9, which bar, in the present instance, is of semi-circular form and has its channel opening upward. The arms 8, 8 and bar 9 together form the main frame of the fender, and such frame is adapted to have vertical swinging movements on the pivots 7. The bar 9 extends at its ends beyond the respective arms a sufficient distance to project in advance of the front wheels of the vehicle, as shown in Fig. 5.

The fender is provided with a minor frame, which comprises the cross-bar 10 and the two arms 11, 11 projecting rearward therefrom at the inner sides of the respective main fender arms 8, 8, and have their rear ends pivoted to the inner sides of the arms 8, 8, as at 12, to permit the two frames to have relative jaw-like opening and closing movements. The bar 10 corresponds in length to the bar 9 and is of channel form with its open side down to adapt it to fit over and close the channel in the bar 9. The two bars 9 and 10 are connected by an apron or net 13.

A rod 14 is disposed at each side of the fender and is pivotally carried at its rear end by a stud 15 projecting inwardly from the adjacent arm 8 at a point slightly forward of the pivot 7, as shown. The forward end of the rod 14 carries a shaft 16, one end of which carries a roller 17 and projects into a horizontal slot or elongated opening 18 in the bracket member 3 for backward and forward movements therein when the arms 8 are lowered and raised. The other end of the shaft 16 projects under the adjacent frame arm 11 at a point in advance of the pivot 12, and upon a downward swinging of the frame arm 8 moves rearward in supporting engagement with the arm 11 and coöperates with the pivot 12 to effect a raising of the arm 11. It will also be understood that the rearward movement of the shafts 16 under the frame arms 11, upon a lowering of the frame arms 8, will effect a more rapid raising of the minor frame to its vertical or open position than would be the case if the shafts 16 remained stationary during a lowering of the main fender frame.

The weight of the outer end portion of the main frame 8, 9 is sufficient to effect a lowering of such frame and a raising of the minor frame when the connection therebetween to be hereinafter described, is released. In order, however, that the fender may be quickly opened, upon a releasing of the same for such purpose, a coiled contractile spring 19 is connected at one end to the end portion of each shaft 16, which projects under or is adjacent to each fender arm 11, and the opposite end of the spring is connected to the lower edge of the adjacent arm 11 at the rear of the shaft 16, as to a pin 20 projecting from the lower edge of the arm 11, as best shown in Fig. 3. The spring 19 is expanded and exerts a considerable opening pull between the parts 16 and 20 and urges a rearward movement of the shaft 16 and its roller 17 in the slot 18, thereby exerting a considerable initial opening pull upon the fender parts.

The catch means employed to retain the two fender frames in closed relation is best shown in Fig. 2 and consists in pivoting a catch member 21 to each lower frame arm 8 adjacent to its forward end, as indicated at 22, the upper end of such catch being adapted to project into a channel or recess provided in the adjacent upper frame arm 11 and to hook over a pin 23 therein. The lower end of each catch member 21 extends below its pivot in the form of a lever and has an arm 24 rigidly projecting forward from its lower end. The free ends of the arms 24 are connected by a front bumper bar 25 slightly in advance of the vertical plane of the forward edge of the fender bar 10 and below the horizontal plane of the catch pivots 22. It is thus evident that any article striking the front of the fender frame will have contact with the bumper bar 25 and move such bar to effect a release of the catch members 21 from engagement with the respective pins 23. A coiled contractile spring 26 connects each catch member to the respective fender arm 8 is a manner to yieldingly retain the catch members in pin engaging position.

In order that the catch means may also be under the control of the driver of the car a flexible draft member 27 extends rearward from the lower end of one of the catch members 21 to a lever member 28 which is pivoted to the automobile frame adjacent to the control lever 2, as at 29, Fig. 1. The lever 28 extends upward from its pivot at the rear of a stud 30 projecting from one side of the control lever 2 so that a rearward or brake applying movement of the lever 2 will cause a rearward rocking of the lever 28 and a consequent releasing movement of the catch members.

In Figs. 6, 7 and 8 is shown a slightly modified form of the operating connection between the upper and lower fender frames whereby such frames are caused to have opposed opening movements when the lower frame is swung downward. In this form of the invention the arms 11, 11 of the upper fender frame instead of being pivoted at their rear ends to the respective arms 8 of the lower frame are pivoted, as at 31, to the bracket member 3ᵃ which is rigidly secured to the adjacent frame bar and pivotally carries the adjacent fender frame arm 8. The free end of each arm 11 is formed or provided with a segment gear 32 in mesh with a similar gear 33 which is fixed to a side of the adjacent arm 8 near its swinging axis.

It is evident that a releasing of the catch means which secures the two frames of the fender in folded or closed relation, permits the lower or main frame, in the present instance, to drop both by gravity action and by the influence exerted thereon by the springs 19. It is also evident that a lowering of the frame 8—9 will cause a lowering of the pivots 12 of the upper frame relative to the shafts 16 and will also impart a rearward movement to such shafts, thereby causing an upper swinging of the upward frame simultaneously with the downward swinging of the lower frame, thus stretching the apron 13 in front of the machine. It will be understood that upon a lowering of the lower fender frame the shafts 16 are drawn rearward under the arms 11 of the upper frame, thereby accelerating or increasing the speed of raising movement of the upper frame over the movement which it would have if the shafts 16 remained stationary relative to the frame 8, and also throwing the upper frame upward to a greater extent than would otherwise be the case. The weight of the lower frame over that of the upper frame, and also the action of the springs 19 thereon, causes the frames to have a rapid opening movement when released for such purpose. The fender is closed by raising the lower frame, and during the closing movements of the two frames the apron 13 is folded or moved backward and forward within the channel bars 9, 10 of the two frames. A quick release of the means which holds the two frames in closed position may be effected either by an object striking against the front bumper bar of the fender or by the driver throwing the emergency brake lever 2 into braking position.

I wish it understood that my invention is not limited to any specific construction, arrangement or form of the parts, as it is capable of numerous modifications without departing from the spirit of the claims.

Having thus described my invention, what I claim as new, and desire to secure by Letters Patent, is,—

1. A fender having two hingedly connected frames adapted to automatically open when released, an apron connection between the outer end portions of said frames, releasable means for holding the frames in closed relation, and means operable by opening movements of the frames when released to accelerate such opening movement.

2. A fender having two frames connected for opening and closing jaw-like movements and normally operable to have opening movements, an apron connecting said frames, releasable means for holding the frames in closed position, connection between said frames for causing them to have opposed movements in unison, and spring means for urging quick initial opening movements of the frames when released.

3. A fender having pivotally connected upper and lower frames, the lower frame having gravity lowering movements, an apron connection between the outer end portions of said frames, releasable means for holding the frames in closed relation, means operable to effect a raising of the upper frame when the lower frame is lowered, and means operable to urge a quick opening of the frames when released for such purpose.

4. A fender having a main frame, a second frame hinged to said main frame, means coöperating with the swinging movements of the main frame to cause the second frame to have opposed swinging movement, a flexible apron connecting the outer ends of said frames, releasable means for holding the frames in closed relation, and spring means connecting said first-mentioned means and one of said frames for effecting a quick opening movement of the frames when released for such purpose.

5. The combination with the side frame bars of an automobile chassis, of a fender having a main frame pivoted for vertical swinging movements to the forward ends of said bars, a second frame hinged to said main frame, means coöperating with the main frame to cause the second frame to swing upward upon a downward swinging of the main frame, an apron connecting the outer ends of said frames, means for holding the frames in closed relation, and means operable to effect a quick initial opening of the frames when released.

6. A fender having a main frame mounted for swinging movements about a fixed axis, a second frame hingedly carried by said main frame for swinging movements relative thereto, an apron connecting the outer ends of said frames, means coöperating with the swinging movements of the main frame to impart opposed swinging movements to the second frame, and releasable means for retaining the two frames in closed relation.

7. A fender having a main frame mounted for vertical swinging movements, a second frame hingedly carried by said main frame for swinging movements relative thereto, means coöperating with the swinging movements of the main frame to impart opposed swinging movements to the second frame and to urge an opening movement of the frames, releasable means for retaining the two frames in closed relation, and an apron connecting the outer ends of the frame.

8. A fender having a vertically swinging frame, means carried by said frame and automatically operable to swing in opposite directions to the swinging movements of the frame when the frame is swung, spring means for urging an opening movement of said frame and means, and flexible connection between the outer end portions of said frame and the means carried thereby.

9. In combination, a support, a fender having a main frame pivoted to said support for vertical swinging movements, a second frame pivotally carried by said main frame, an apron connecting the outer ends of said frames, releasable catch means for holding said frames in closed relation, and means coacting with said second frame to effect an opening movement thereof when the main frame is lowered and automatically movable by lowering movements of said main frame to accelerate the opening movements of the second frame.

10. In combination, a support, a main fender frame pivoted to said support for vertical swinging movements, a second fender frame pivoted to said main frame for vertical swinging movements thereto, an apron connecting the outer ends of said frames, a member mounted for horizontal movements and having coaction with said second frame to cause it to swing upward when the main frame swings downward, and connection between said member and the main frame for horizontally moving the latter when the main frame swings downward to accelerate the upward swinging movement of the second frame.

11. A support having horizontal slots therein, a main fender frame pivoted to said support for vertical swinging movements, a second fender frame pivotally carried by said main frame for vertical swinging movements relative thereto, an apron connecting the outer ends of said frames, members guided for horizontal movements by said slots and having sliding coaction with said second frame in advance of its swinging axis, said members coöperating with the main frame to effect an upward swinging movement of the second frame when the main frame swings downward, means connecting said members and main frame for moving said members toward the main frame axis when the main frame is swung downward, and releasable means for retaining the frames in closed relation.

12. The combination with a support having horizontal slots therein, of a main fender frame pivoted to said support for vertical swinging movements, a second fender means pivotally carried by said main frame for vertical swinging movements relative thereto, the swinging axis of the second frame being in advance of the swinging of the axis of the main frame, an apron connecting the outer ends of said frames, members guided for horizontal sliding movements by said slots and coacting with the second frame in advance of its swinging axis to effect a vertical swinging of said frame when the main frame is swung downward, means operable by swinging movements of the main frame to horizontally move said members, means urging a movement of said members in one direction, and releasable means for retaining said frames in closed relation.

13. The combination with the side bars of an automobile chassis, of bracket members removably secured to the forward end portion of each side bar, a main fender frame pivoted to said brackets for vertical swinging movements, a second fender frame pivotally carried by said main frame for vertical swinging movements and having its swinging axis disposed in advance of the swinging axis of the main frame, an apron connecting the outer ends of said frames, a member guided for limited horizontal movements by each of said bracket members and having coaction with said second frame when the main frame is swung downward, means operable by a downward swinging of the main frame to move said coacting members rearward, means yieldingly urging an opening movement of said frames, and releasable means for retaining the frames in closed relation.

14. A fender having a vertically swinging main frame, a second frame pivotally carried thereby for vertical swinging movements, an apron connecting the outer ends of said frames, means for effecting an upward swinging of the second frame upon a downward swinging of the lower frame, and means for releasably retaining said frames in closed relation and automatically operable by contact with an obstacle in advance of the fender to release the frames.

15. In a fender, two pivotally mounted frames, an apron connecting the outer ends of said frames, means for causing one frame to swing upward when the other swings downward, and means for retaining said frames in closed relation and automatically operable by contact with an obstacle in advance of the fender to effect a release of the frames.

16. In a fender, two pivotally mounted frames, an apron connecting the outer ends of said frames, means for causing one frame to swing upward when the other swings downward, and means for retaining the frames in closed relation and manually or automatically operable to release said frames.

17. In a vehicle, the combination with the frame thereof and a control lever, of a fender having two pivotally mounted frames, an apron connecting the outer ends of said frames, and means for retaining said frames in closed relation and operable to release them upon a predetermined movement of said lever.

18. In a vehicle, the combination with the frame thereof, and a control lever, of a fender frame hinged to the vehicle frame for vertical swinging movements, a second frame hinged to said fender frame, an apron connecting the outer ends of said fender frames, means coacting with said second frame to impart an upward swinging movements thereto when the main fender frame is swung downward, and means for retaining said main and second fender frames in closed relation and operable to release them upon a predetermined movement of said lever.

In testimony whereof, I have hereunto signed my name to this specification in the presence of two subscribing witnesses.

IRA O. DENMAN.

Witnesses:
F. E. AUL,
M. H. MAYERS.